(12) United States Patent
Beloussov et al.

(10) Patent No.: US 7,698,400 B1
(45) Date of Patent: Apr. 13, 2010

(54) DEDICATION OF ADMINISTRATIVE SERVERS TO MANAGEMENT OF SERVER FUNCTIONS IN A MULTI-SERVER ENVIRONMENT

(75) Inventors: Serguei Beloussov, Singapore (SG);
Stanislav S. Protassov, Singapore (SG);
Alexander G. Tormasov, Moscow (RU)

(73) Assignee: SWsoft Holdings, Ltd. (BM)

( * ) Notice: Subject to any disclaimer, the term of this patent is extended or adjusted under 35 U.S.C. 154(b) by 1436 days.

(21) Appl. No.: 10/826,280

(22) Filed: Apr. 19, 2004

(51) Int. Cl.
*G06F 15/16* (2006.01)
*G06F 15/173* (2006.01)
*G06F 15/177* (2006.01)

(52) U.S. Cl. ............... 709/223; 709/226; 709/203; 709/229; 719/313; 719/328

(58) Field of Classification Search ......... 709/217–229, 709/203, 204; 719/313, 328; 707/204
See application file for complete search history.

(56) References Cited

U.S. PATENT DOCUMENTS

| | | | |
|---|---|---|---|
| 5,905,990 | A | 5/1999 | Inglett |
| 6,560,613 | B1 | 5/2003 | Gylfason et al. |
| 6,618,736 | B1 | 9/2003 | Menage |
| 6,754,716 | B1 | 6/2004 | Sharma et al. |
| 6,907,421 | B1 | 6/2005 | Keshav et al. |
| 7,188,120 | B1 * | 3/2007 | Leonard et al. ............ 707/102 |
| 7,219,354 | B1 * | 5/2007 | Huang et al. ............... 719/328 |
| 7,328,225 | B1 * | 2/2008 | Beloussov et al. .......... 707/203 |
| 7,337,445 | B1 * | 2/2008 | Price et al. ................. 719/313 |
| 7,461,144 | B1 * | 12/2008 | Beloussov et al. .......... 709/223 |
| 7,461,148 | B1 * | 12/2008 | Beloussov et al. .......... 709/226 |
| 7,502,861 | B1 * | 3/2009 | Protassov et al. ........... 709/229 |
| 7,584,228 | B1 * | 9/2009 | Protassov et al. ........... 707/204 |

OTHER PUBLICATIONS

U.S. Appl. No. 60/469,559, 050903, Virtualization and namespace isolation in Solaris, John Beck, Apr. 8, 2003, pp. i through viii and 1-80.*
TechOne hosting—Complete hosting solutions, Feb. 17, 2003, pp. 1-30.*

* cited by examiner

*Primary Examiner*—Haresh N Patel
(74) *Attorney, Agent, or Firm*—Bardmesser Law Group (57) ABSTRACT

A system for managing administration of computer services provided to users includes a computer system and an operating system running on the computer system. A server process is launched by the computer system for providing services to users. An isolated Virtual Private Server (VPS) has a set of services that perform administrative operations relating to the server process. The server process can be a webserver, a file server, an FTP server, an authentication server, a VPS, a chroot environment, a jail environment, a sand box environment, a print server and a Windows Terminal Service. The administrative operations can include collection of statistics relating to the server process; servicing of requests for management of the server process; servicing of requests for management of operating system functions; servicing of requests for computer system resource allocation; servicing of requests for computer system resource re-allocation; servicing of requests for authorization within the operating system; servicing of requests for authorization within the server process; servicing of requests that the server process is forbidden from executing; servicing of operations that potentially can cause a fault in the server process; and servicing of operations that require multiplexing of server processes. The multiplexing can be based on a network protocol addressing, or on a content of a request directed to the server process. The VPS isolation can include logical isolation of processes, physical isolation of processes, resources isolation, namespace isolation, data isolation, address isolation, fault isolation and performance isolation.

35 Claims, 7 Drawing Sheets

DEDICATION OF ADMINISTRATIVE SERVERS TO MANAGEMENT OF SERVER FUNCTIONS IN A MULTI-SERVER ENVIRONMENT

BACKGROUND OF THE INVENTION

1. Field of the Invention

The present invention relates to management of computer servers, and more particularly, to dedication of one or more servers for administrative functions and management of servers that handle user requests.

2. Related Art

Computer systems, such as those that run server processes, typically have a set of services (sometimes called "daemons") that are used for servicing user requests and operating system requests. These services can be dedicated to servicing requests from external anonymous users, for example, a WWW service or an anonymous FTP service. They can also be used for servicing requests from authorized users, such as FTP service and email service POP3/IMAP4 (Post Office Protocol 3/Internet Message Access Protocol (version 4).

Such services are typically launched as one or more operating system processes/threads and live within operating system space, which includes within it a common object name space. Examples of such types of objects with operating system-wide names or identifiers include process identification (PID), file names, named pipes, TCP port IDs, etc. Each service, upon request and when available, receives appropriate resources from the operating system, which it then uses to service user requests.

For management (administration) of these services, typically a system administrator is necessary, who enters appropriate operating system commands and can monitor the state of the operating system and the services. A particular case of a system administrator is an operator, who is typically allowed only a highly restricted subset of functions—for example, checking of server statistics, management of print queues, etc.

The cost of a system administrator for the owner of such a system (e.g., a data center) is often a substantial part of the total costs of ownership (TCO). Easing the burden on such a system operator and enabling a substantial commonality of his activities is an important issue in software development for data center administration.

The job of an administrator, as it relates to administrative services, often includes not just direct commands to the computer system for performance of specific actions, but also involves certain "indirect" operations. Examples of such indirect operations include assurance of an appropriate level of security, verification of system state, backing up data and creation of backup databases, provision of new servers and services, load balancing, etc. Attempts to ease the burden on the operator for providing such functions take several forms. For example, the use of Virtual Private Servers (VPSs) allows at least some commonality among the various server processes running within the computer system, and also allows commonality in their instantiation and configuration. Usually VPSs are installed with mass administration tools, for example, Virtuozzo™ VPS (available from SW-soft, Inc. of Herndon, Va., USA) has a set of special scripts, command line and Graphical User Interface utilities for such a purposes.

The problems of administration of a large set of services and servers for many users is widely known, especially to administrators of web hosting companies and data centers. Each routine operation often requires expensive manual operations and, when handling thousands of users even on a single hardware box with a single operating system, each simple operation, which should be performed hundreds and thousands of times becomes very expensive. Unification and simplification of mass operations therefore can result in a significant economical benefit.

Another ever-present problem is assuring a level of safety and security of the services provided to the users. For example, authentication of users and user login verification has to occur within a safe environment. Any failures and crashes of services for one user should not affect services for other users, and should not affect overall system security.

The concept of a so-called "sandbox" is one known way of solving such a problem. For example, in the UNIX environment, it is common to place the FTP services for anonymous users within a "sand box." In that case, even if an intruder manages to gain access to that particular server and "breaks it," then his malicious activities still occur within the sand box (a secure environment), and the intruder cannot gain access to any critical system data in this fashion.

Additionally, there may be issues with execution of non-standard operations. One type of such non-standard operations is "dangerous" operations, that can result in an unpredictable state of the system. Examples include remote services reboot and remote firewall configuration operation. In the case of remote services reboot, should that process fail to reboot and re-initialize the appropriate server process properly, the only recourse available to an administrator of that particular process (for example, to a remote VPS administrator) is to request expensive manual intervention from the system administrator. In the case of remote firewall configuration, the person configuring the firewall could accidentally mis-configure it in a manner that even the administrator or operator of such a firewall is himself blocked from any further access through the firewall. This results in a server process or a VPS, that is "empty," i.e., running "normally," but is in reality useless because it is inaccessible.

Other non-standard operations include organization of services providing name-based hosting for web users, where a number of virtual web servers share the same IP address with a single logical instance of webserver.

Accordingly, what is needed is a system and method for providing a more secure and more reliable mechanism for managing administrative functions in a multi-server environment, as well as a way to simplify mass management operations.

SUMMARY OF THE INVENTION

The present invention relates to dedication of administrative servers to management of server functions in a multi-server environment that substantially obviates one or more of the disadvantages of the related art.

More particularly, in an exemplary embodiment of the present invention, a system, method and computer program product for managing administration of a group of services provided to users include a computer system and an operating system running on the computer system. A server process is launched by the computer system for providing services to users. A service Virtual Private Server (VPS) performs administrative operations relating to the server process. The server process can be, for example, a webserver, a file server, an FTP server, an authentication server, a VPS, a chroot environment, a jail environment, a sand box environment, a print server and/or a Windows Terminal Service. The administrative operations can be, for example, collecting statistics relating to the server process; servicing of requests for management of the server process; servicing of requests for management of operating system functions; servicing of requests for computer system resource allocation; servicing of requests for computer system resource re-allocation; servicing of requests for authorization within the operating system; servicing of requests for authorization within the server process; servicing of requests that the server process is forbidden from executing; servicing of operations that potentially can cause a fault in the server process; and servicing of operations that require multiplexing of server processes. The multiplexing can be based on a network protocol addressing, or on a content of a request directed to the server process.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
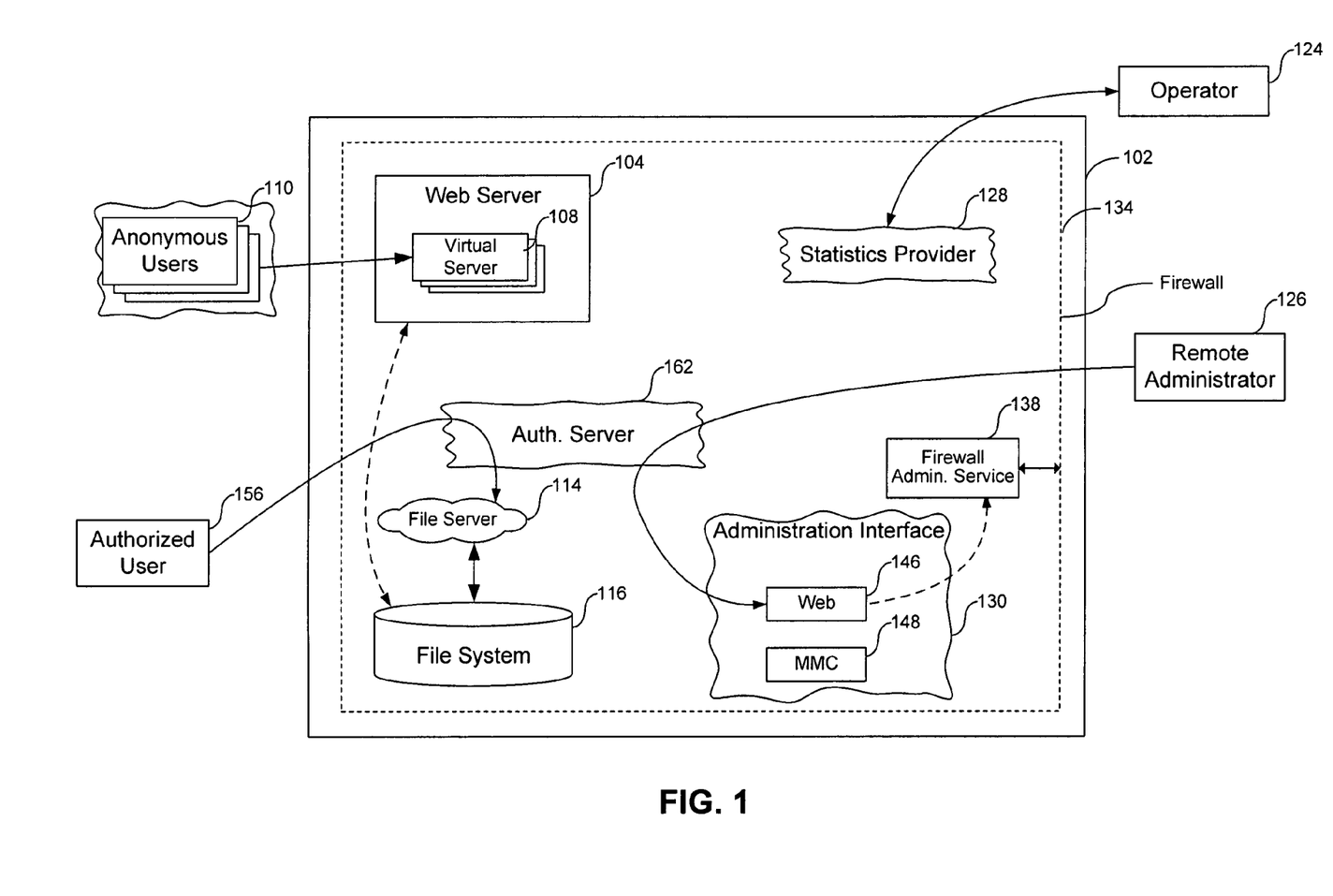
FIG. 1 illustrates a generic computer system with a built-in firewall.

FIG. 1 illustrates a generic computer system 102 with an optional built-in firewall 134. If the firewall 134 is present, all contact with external entities occurs through the firewall 134. The computer system 102 may have a server process running, such as a webserver 104 (or a number of such webservers 104). The webserver 104 may have a number of virtual servers 108 running within it. The virtual servers 108 may interface to anonymous external users 110. Here, anonymous users 110 are, or example, users accessing a web page on the virtual server 108 by clicking on a link in their browser (in other words, without mandatory registration or a log-in of any kind as a user of the system 102).

The computer system 102 also may include some form of a statistics provider 128, which may be accessible by an operator 124. The statistics provider 128 is normally used to gather resource usage and other performance/utilization statistics for the various processes/services that run within the computer system 102.

An authorization server 162 is used to authorize users 156 and remote administrators 126. The authorization server 162 can be used by a file server 114, which interfaces with a file system 116. An example of an authorized user 156 is a user that needs to download certain files from the file system 116 using an FTP protocol.

The computer system 102 also includes the administration interface 130, which is used by the remote administrator 126 to manage the operations of, for example, the authorization server 162 or the firewall 134. The administration interface may include, for example, a web interface 146 of the administrative system. It may also include a Microsoft Management Console (MMC) 148 or other interfaces. These interfaces 146, 148 enable the remote administrator 126 to manage appropriate computer services. Example of such a service is a firewall administrative service 138 that manages the settings of the firewall 134, and may be controlled by the remote administrator 126 through the administration interface 130.

Note that the operator 124 is often a person whose job it is to continually monitor the state of the computer system 102 (or a number of such computer systems).

Figure 2:
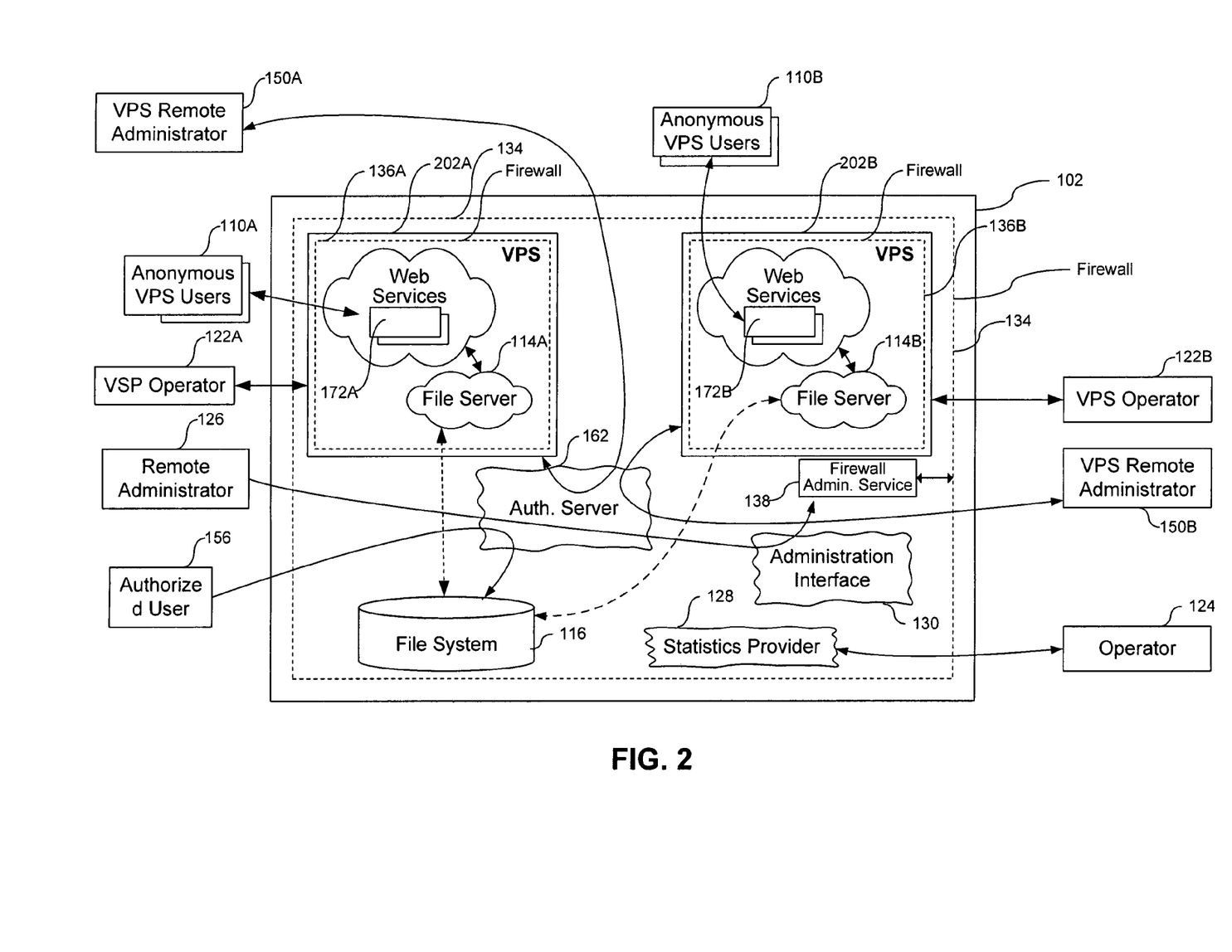
FIG. 2 illustrates a variation on FIG. 1 in the context of Virtual Private Servers (VPSs).

FIG. 2 illustrates a variation on FIG. 1, particularly in the context of Virtual Private Servers, examples of which are also described in co-pending commonly assigned U.S. patent application Ser. No. 10/703,594, filed on Nov. 10, 2003, entitled VIRTUAL PRIVATE SERVER WITH ISOLATION OF SYSTEM COMPONENTS, which is incorporated by reference herein in its entirety. In FIG. 2, the webserver 104 of FIG. 1 has been replaced by a number of server processes, such as Virtual Private Servers (VPSs) 202A, 202B, etc. Each such Virtual Private Server 202 has its own corresponding remote administrator 150A, 150B, which are typically authorized through the authorization server 162 (or can use their own authorization service). Each VPS 202A, 202B has corresponding anonymous VPS users 110A, 110B, which access web services 172A, 172B through optional firewalls 136A, 136B of each individual VPS 202A, 202B. Each VPS 202A, 202B optionally can have its own file server 114A, 114B, which interfaces to the file system 116 and to respective web services 172A, 172B of the VPSs 202A, 202B. Each VPS 202A, 202B is operated by its corresponding VPS operator 122A, 122B (if any).

Each computer system can have one or more sets VPSs that are similar in implementation technology, with one or more of them being dedicated to administration purposes. Similarity may include a common way of numbering (or identifier creation for each VPS) and common implementation technology (e.g., VM-like, separation of namespaces like Virtuozzo™, chroot/jail environments, logical grouping, etc.).

A VPS illustrated in FIG. 2 (for example, 202A) is an example of a server process, or group of services. Such a group of services may be, for example, web services 172A with or without other services. They may also be, for example, a file server, an FTP server, an authentication server, a chroot environment, a jail environment, a sand box environment (all discussed below), a print server or a Microsoft Windows Terminal Service. Other examples of a server process include POP3 servers, IMAP/IMAP4 servers, SMTP (Simple Mail Transfer Protocol) servers, web servers, resources scheduler servers, COM/COM+/DCOM (Component Object Model/extended COM/Distributed COM) servers, cryptographics servers, browser servers, DHCP (Dynamic Host Configuration Protocol) servers, Distributed file system servers, Distributed Link tracking servers, event log servers, reporting servers, DNS (domain name servers), file replicator servers, SSL (Secure Socket Layer) servers, indexing servers, firewall servers, Kerberos servers, IPSEC servers (IPSEC is a protocol suite used for secure communication at a network layer between two peers), instant messaging servers, message write (messenger) servers, logon servers, Network DDE (Dynamic Data Exchange) servers, NLA (Network Location Awareness) servers, performance logs and alerts servers, plug and play servers, print spooler servers, protected storage servers, disk encryption servers, routing servers, remote access servers, security account manager servers, system event notification servers, telnet servers, telephony servers, uninterruptible power supply servers, virtual disk servers, Windows installer servers, Windows Management Instrumentation (WMI) wireless configuration servers, WMI performance adaptor servers, data base servers, Network address translation servers, IRC (Internet Relay Chat) servers, chat servers, X windows servers, inetd servers, volume shadow copy servers, boot and remote boot servers, finger servers, secure shell (SSH) servers, who servers, rexec servers, webster servers, conference servers, Radius™ servers, zip servers, socks servers, afbackup servers, backup servers, ASP (Active Server Pages) servers, fido servers, WAP (Wireless Application Protocol) servers Plesk Server™ (available from SW-Soft, Inc.), Virtuozzo™ servers (available from SW-Soft, Inc.), Virtuozzo for Windows™ servers (available from SW-Soft, Inc.), wireless access servers, wireless routers and wireless access points, Windows workstation server, NET BIOS servers, NET BEUI servers, and various TCP/IP servers.

In this discussion, a VPS is understood to be a set of services with an identifier that is unique in some context. There are ways to distinguish one VPS from another, which are referred to as "isolation". The VPSs can be different in nature, and their isolation can also be different, depending on the technical implementation. Some VPS can be implemented in form of "Virtual Machine" or computer hardware emulators (for example, Microsoft Virtual PC or VMware virtual machine, User Mode Linux, Windows Application Binary Interface (WABI)). This is typically a user-level process or set of processes running inside normal standard operation system (such as Linux, Microsoft Windows, other Unix implementations, and so on) that emulate inside virtual machine some computer hardware (such as a disk, CPU, peripheral devices, etc). From the user's point of view, this emulation provides a "virtual computer hardware" in which he can perform the same operations that he can perform on a typical stand-alone workstation, server or notebook computer. For example, the user can install and run inside the "virtual machine" (VM) a separate (his own copy) operating system, including an OS kernel and a set of user mode processes. Technically, implementation of such a "VM" can use architecture-specific features of the platform, or can be implemented cleanly inside user-mode applications. VMware VM is implemented using a so called "monitor" that uses support from the x86 architecture to effectively process virtual memory operations inside the emulator.

Another way to implement a VPS is to separate a set of processes in a single OS kernel. Each VPS can be declared to have a set of OS processes, kernel structures, etc. Depending on the particular implementation, this approach can involve different levels of isolation-starting from hard resources isolation with guarantees, separate disk space, etc up to a virtual absence of resource isolation.

VPS isolation can include, for example, logical isolation of processes, physical isolation of processes, resources isolation, namespace isolation, data isolation, address isolation, fault isolation and performance isolation (partial or full).

Isolation of processes refers to processes that are running in the same OS kernel, but are separated by means of OS or user space processes. Physical isolation of processes means that processes are running in different media (for example, in native OS and inside the virtual machine discussed above). Resource isolation means that resources used inside one VPS are not available in another VPS (for example, dedicated disk areas, VM emulators, dedicated CPU, etc.). Namespace isolation refers to the case where names used in one VPS can be used inside another VPS—for example, they can have same names of OS named objects, same user names and so on—but objects with the same names will be different in different VPSs. Data isolation refers to the case where data used in one VPS is isolated and cannot be used in another VPS. For example, each VPS can have its own private set of files for webserver services.

Address isolation refers to each VPS having its own isolated addresses that cannot be used inside another VPS. For example, the VPSs can have different IP addresses, different DNS names or processes with different OS Process Identifiers (PIDs).

Fault isolation refers to isolation of faulted application, i.e., if the application fails in one VPS, another VPS will be not affected.

Performance isolation is where behavior of one VPS (or of processes inside one VPS) will not influence to performance of another VPS if the user requests for service are within a specified some service level agreement (SLA) bounds.

Physical hardware isolation is used to configure single computer hardware so that it appears to be split into a set of semi-independent computers. An examples of this is the scheme previously used by Sun Microsystems, Inc. for domain partitioning, as well as "blade" servers set, etc.

Logical hardware isolation is used to logically reconfigure a single hardware to a set of semi-independent computers, An example of this is IBM LPAR (logical partitioning).

Examples of VPS implementation technologies includes SWsoft Virtuozzo™ technology, Microsoft Windows Terminal Services, FreeBSD jail and Unix chroot environments.

The most straightforward implementation can include only nominal "logical" isolation, when only the user knows which processes belongs to which VPS, without any special support in OS kernel and even without support in user-mode applications. In such an implementation, the term VPS can still be used, because typically users can treat this group of services as a logically indivisible entity. This can also include so called "virtual servers" of a webserver that share single instances of Apache server and use an IP address and/or DNS name for services separation. SWsoft Plesk™ servers use separate webservers for normal users and for administrators. This allows treating, so, them as two VPSs, with one of them dedicated to administration purposes With the above discussion in mind, each group of services may be optionally protected by its own firewall (here, 136A, 136B). It may have its own file server (here, 114A, 114B). The services provided by the group of services, or by the VPS 202A, are grouped together in some logical manner from a user's or operating system's perspective. Each NIPS 202A may optionally have its own webserver (for example, 104 of FIG. 1). The administration interface 130 may be dedicated to managing this particular group of services (202A), and/or several groups of services, and/or the entire computer system 102.

Figure 3:
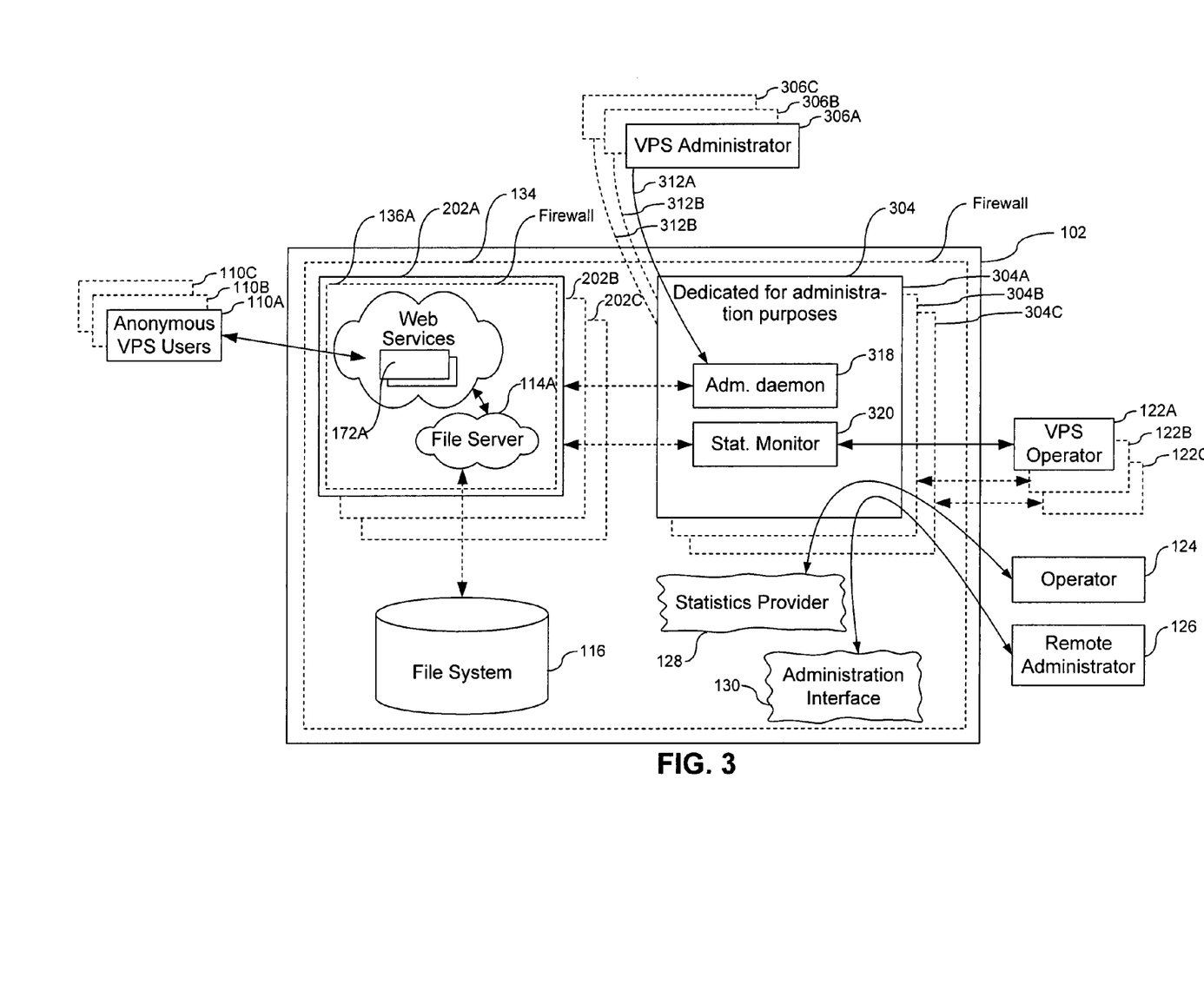
FIG. 3 illustrates an embodiment of the present invention where one VPS has been dedicated for administrative purposes.

FIG. 3 illustrates an embodiment of the present invention where one of the groups of services (for example, a "service VPS," an "isolated VPS" or an "administrative server") has been dedicated to administrative purposes, and is labeled 304 in FIG. 3. For simplicity, element 304 will be referred to in the text below as a "service VPS," although it is understood that it need not always be a VPS, but rather is a logical dedicated grouping of certain administrative and/or other processes/functions that relate to the management of the VPSs 202 and/or the management functions of the computer system 102 and its operating system. A set of groups 304 can also be used for such administrative purposes. The term "administrative" is used in a broader sense than its typical usage, and includes additional functions that extend beyond normal administrative functions, such as, for example, responding to user requests and multiplexing of VPSs 202. Administrative functions may also be thought of as operations that are not intended to serve end users, but are auxiliary in nature, such as backup/restore data, or which can be used to provide some enhancements (e.g., performance, scalability, etc.) for computer system itself. Other examples of administrative operations include installation/removal of OS components and user applications, configuring of OS components and user applications, configuring networking hardware and firewalls, computer hardware, and wireless hardware, servicing of VPS migration requests, servicing of processes migration requests, and servicing of requests for computer system resources. Servicing of requests of migration processes from one computer to another one can be done offline (when the process is stopped before migration and is later restored) and online (when the process is migrated transparently to users and other processes).

The service VPS 304 can have its own VPS operator 122, its own administrator 306, and interfaces directly to the statistics provider 128 and the administration interface 130, as shown in FIG. 3. In other words, the service VPS 304 can be conceptually similar to the VPS 202A in the sense of being a server process, but serves different functions.

For example, the VPS 304 can have an administrative daemon 318, which communicates with the VPS 202A for management purposes. Also, a statistics monitor 320 can interface to the VPS 202A, for collection of statistics relating to, for example, resource utilization by the VPS 202A. The statistics monitor can interface to the VPS operator 122.

Note that in FIG. 3, the arrows (communications lines) linking the operator 124 to the statistics provider 128, and the arrow linking the VPS remote administrator 126 to the administration interface 130, go through the VPS 304, although that need not always be the case, and the communication may be direct.

Thus, the VPS 304 is referred to as a "service VPS," an "administrative server," or as a "service environment," since the primary purpose of these VPSs 304 is not servicing end users, but servicing administrative functions (in the broad sense discussed above). Examples of services that may be handled by the service VPS 304 include, for example, the following:

(1) management of chroot environment (a UNIX concept that gives a user an appearance that some private directory is a root directory);

(2) management of a jail environment (a FreeBSD concept) and a sand box environment, both of which refer to creation of a secure environment within a server, where process failure or crash does not affect the rest of the computer system 102;

(3) management of a session of Windows Terminal Service;

(4) management of instances of Virtual Private Servers;

(5) management of Virtuozzo™ Virtual Private Server and Virtuozzo™ Virtual Environment, marketed by SW Soft, Inc.;

(6) management of Plesk servers, marketed by SW Soft, Inc.; and (7) Other examples include data backup and restore operations, updates installation (OS and applications), checking permissions for operations, security-related analysis and operations, audit of operations, application installation and configuration, network and other OS and application parameters configuration, driver installation and upgrade, spam filter operations, firewall installation and configuration, creation/deletion of users creation/deletion of groups, license-related management, remote access management, certificates management and data updates.

With reference to FIG. 3, each VPS administrator 306 does not need to be connected directly to its own VPS 202. Rather, the VPS administrator 306 can be connected to a service VPS 304, or a number of VPS administrators 306A, 306B, 306C, etc. can be connected to corresponding VPSs 202 via the service VPS 304.

Note also that there may be a number of such service VPSs 304, each one dedicated to a particular service. Thus, one such administrative server 304 may be dedicated to handling web page requests, another may be dedicated to handling authorization of administrators of the VPSs 202, another one may be dedicated to handling network traffic management, another one might only handle email, another one might only handle FTP requests, etc. It will be appreciated that in this case, there will not necessarily be a one-to-one correspondence between operators 122A-122C and service VPSs 304A-304C. Generally, there also will not be a one-to-one correspondence between a VPS 202 and a service VPS 304; in other words, normally, one service VPS 304 will interface to a number of VPSs 202. Alternatively, a single service VPS 304 can handle all of the administrative requests for all of the servers 202.

In FIG. 3, 312 designates a request or command from the NIPS administrator 306 to its corresponding VPS, which is intercepted by the service VPS 304. Note that the existence of the service VPS 304 is usually transparent to both users 110, administrators 306, and authorized users 156.

In FIG. 3, the VPS operator 122 can monitor the performance and the statistics of the particular VPS through the service VPS 304.

The service VPS 304 can perform any, or all, or some subset, of the following exemplary functions:

1) response to requests for statistics and performance parameters and the performance counters of a particular VPS 202;

2) response to requests for administration of the operating system and its services and daemons;

3) response to requests for administration of the processes running within the computer system 102 (such as VPSs 202, webservers 104, virtual servers 108, statistics provider 128, etc.);

4) response to requests for allocation or reallocation of resources of the computer system 102;

5) response to requests for authorization within the operating system of the computer system 102;

6) response to authorization within itself (i.e., within the service VPS 304);

7) response to requests for authorization within VPSs 202 and similar processes that require authorization;

8) response to other operations that may potentially be non-executable within either the service VPS 304 or the VPSs 202;

9) response to requests for operation, where the requests could lead to a process failure or a crash within a VPS 202;

10) response to requests originating outside of the service VPS 304, such that to an external user or requestor, the process of generating the response is transparent in the sense that it appears that the target process (e.g., VPS 202) is the actual respondent (see FIGS. 4 and 6, discussed below);

11) response to requests for multiplexing of a service, such that the response is processed either sequentially or simultaneously by the VPSs 202. To an external user, it appears as if the service being requested is performed by a VPS to which the user is connected.

Figure 4A:
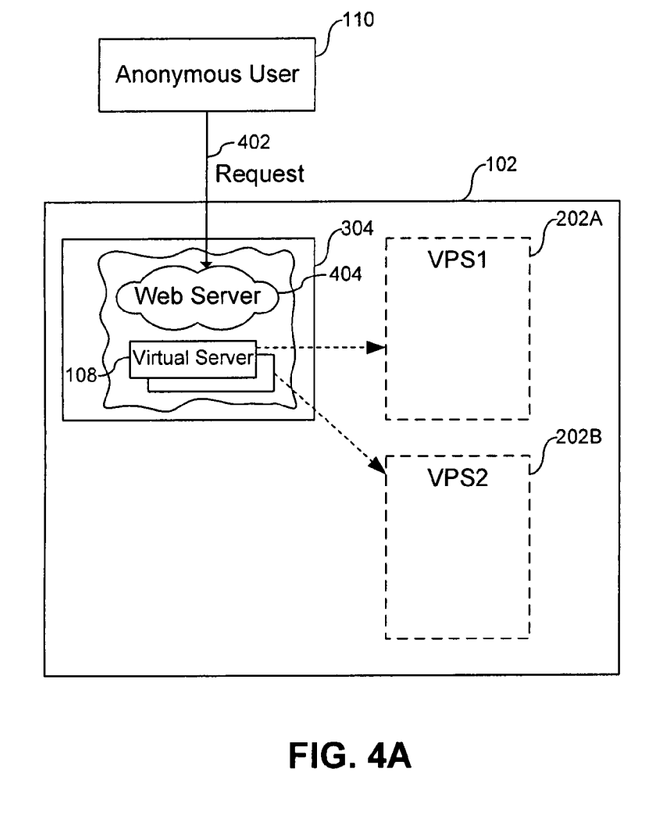
FIGS. 4A and 4B illustrate the process of handling a request from an anonymous user.
Figure 4B:
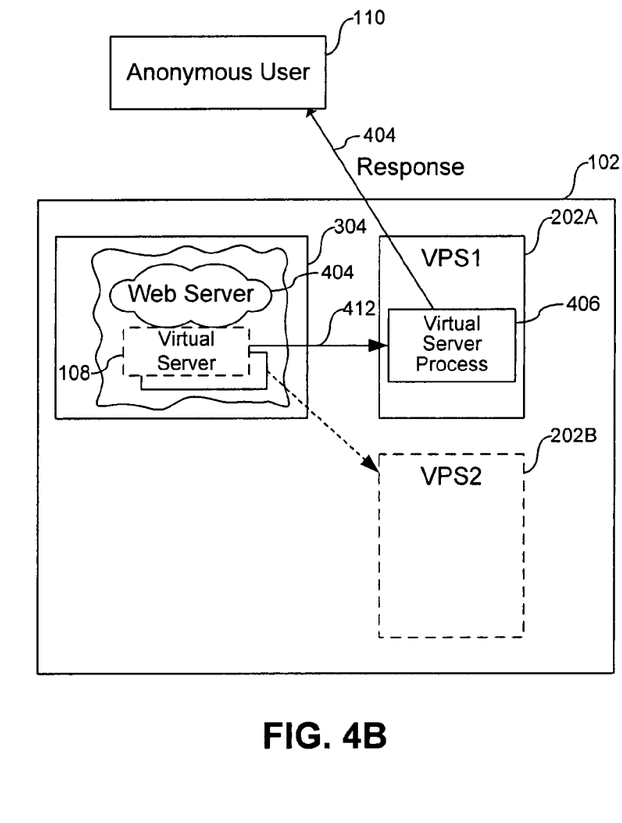

FIGS. 4A and 4B illustrate the process of receiving a request from an anonymous user 110. As shown in FIG. 4A, the anonymous user 110 sends a request 402 to the computer system 102, which is intercepted by the service VPS 304. The service VPS 304 includes a number of virtual servers 108 and a webserver 104. The service VPS 304 determines a processing VPS and routes the request (see 412 in FIG. 4B) to an appropriate VPS (in this case, 202A). The VPS 202A then sends a response 404 back to the anonymous user.

Figure 5:
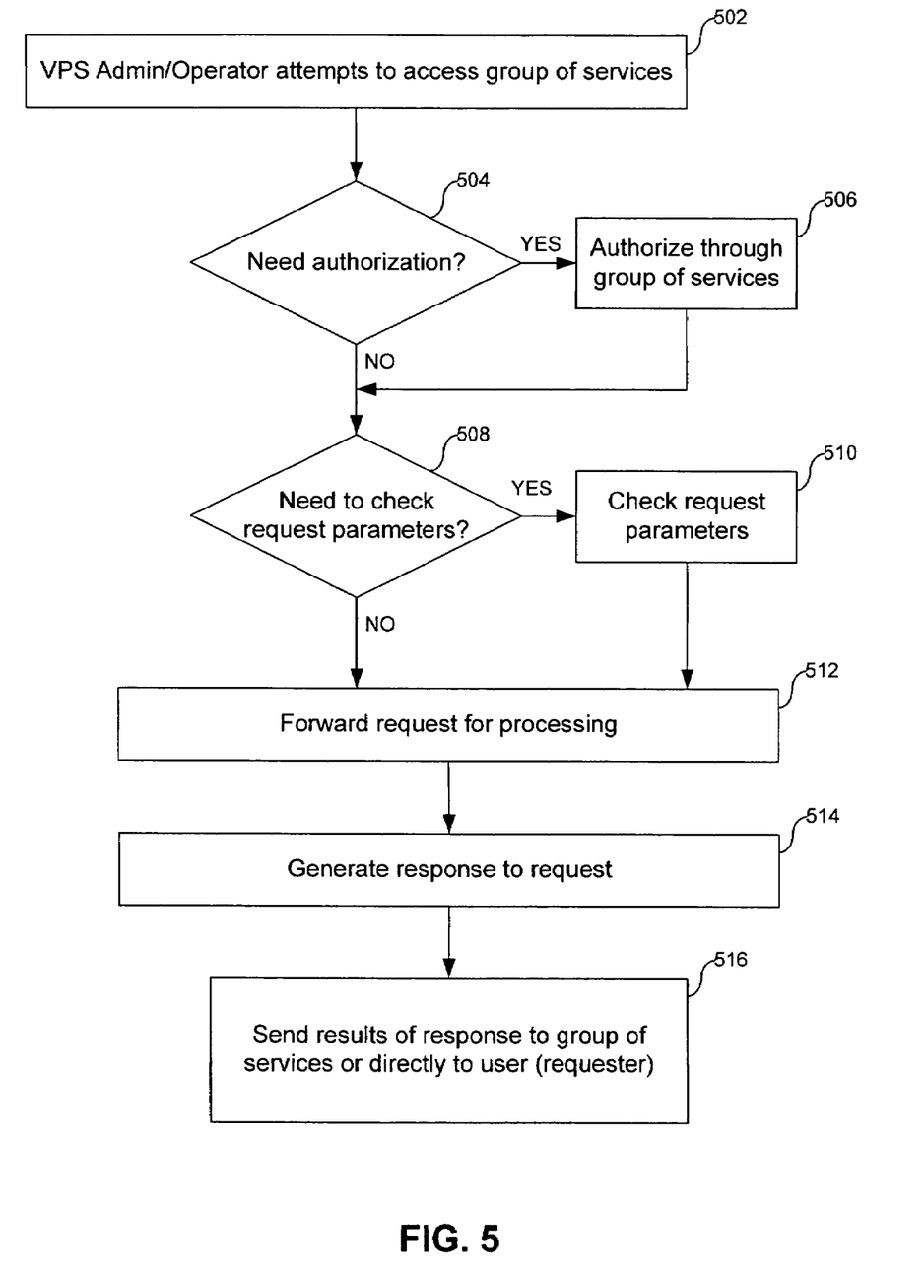
FIG. 5 illustrates the process of servicing a user request.

FIG. 5 illustrates the process of processing a request that requires intervention of the service VPS 304. As shown in FIG. 5, a VPS administrator or a VPS operator attempts to access a VPS 202 in a manner that requires intervention from the service VPS 304 (step 502). If the request 402 needs authorization (step 504), the user is authorized through the service VPS 304 (step 506), and then proceeds to step 508, which determines whether there is a need to check parameters of the request. If no authorization is needed at step 504, then the process proceeds directly to step 508. At step 508, if there is a need to check request 402 parameters, the parameters are checked and verified (step 510). The process then executes the request 402 in a particular VPS 202, for example, forwards it for processing, see 412 in FIG. 4 (step 512). If parameters of the request do not need to be checked, then the process proceeds directly from step 508 to step 512. After step 512, a response to the request is generated (step 514). The response is then forwarded to the requestor (step 516).

Thus, the process of servicing a user request, which is illustrated in FIG. 5, is handled by the service VPS 304, and typically includes a number of steps, such as:

1) receiving a request 402 by the service VPS 304, where the request is typically received through a network or some other communications channel. The communications channel may include network connections and sockets, network protocols, inter-process communications used by the operating system, remote procedure calls, local procedure calls, and data exchange mechanisms (see 312, 402, and 404 in FIGS. 3 and 4);

2) optional authorization;

3) optional verification of request 402 parameters by the service VPS 304;

4) transferring the request 402 to the target process or environment (e.g., to the VPS 202);

5) processing the request 402 at the target process or environment;

6) optional sending of the response 404 from the processor of the request to the requestor;

7) optional sending of the response 404 to the user (requester) by the service VPS 304.

A fact of life of data center operation, particularly operation of certain types of webservers, is that the vast majority of the time the servers are not actually doing anything. For example, in the case of webservers maintained by individuals, and which contain personal content (for example, family photos, etc.), the absolute majority of the time such a webserver is not actually responding to any requests, since there are no requests to respond to. However, such a webserver, which can include all the usual aspects of a webserver (in other words, the server itself, firewalls, file servers, etc.) still involves substantial overhead. For example, it may require 10 megabytes of actual, physical memory for each such web server. Clearly, this is a wasteful approach, and it would be preferable, in the case of such mostly inactive webservers, to only activate them when necessary. At the same time, the fact that the webserver is not actually "alive" most of the time should be transparent to the user.

In this case, the Virtual Private Servers (202A, 202B, etc.) need not actually exist, until a request 402 is received. Alternatively, if they exist, they can exist in a "minimal" form, that requires only very modest overhead. At the moment of receiving the request 402, the service VPS 304 determines where that request should be routed, activates the appropriate VPS, and forwards the request to that VPS. A virtual server process 406 can be launched within the VPS 202A to handle generating the response 404. The response 404 may be routed to the anonymous user directly, or may be routed to the anonymous user 110 back through the webserver 104 within the service VPS 304. This mechanism allows a multiplexing of requests by anonymous users 110. The service VPS 304 can determine which VPSs 202 need to live "permanently," and which can be terminated and instantiated only upon receiving a request for service. Note that in FIG. 4, although the requester is shown as the anonymous user 110, the requester may also be an authorized user.

Figure 6:
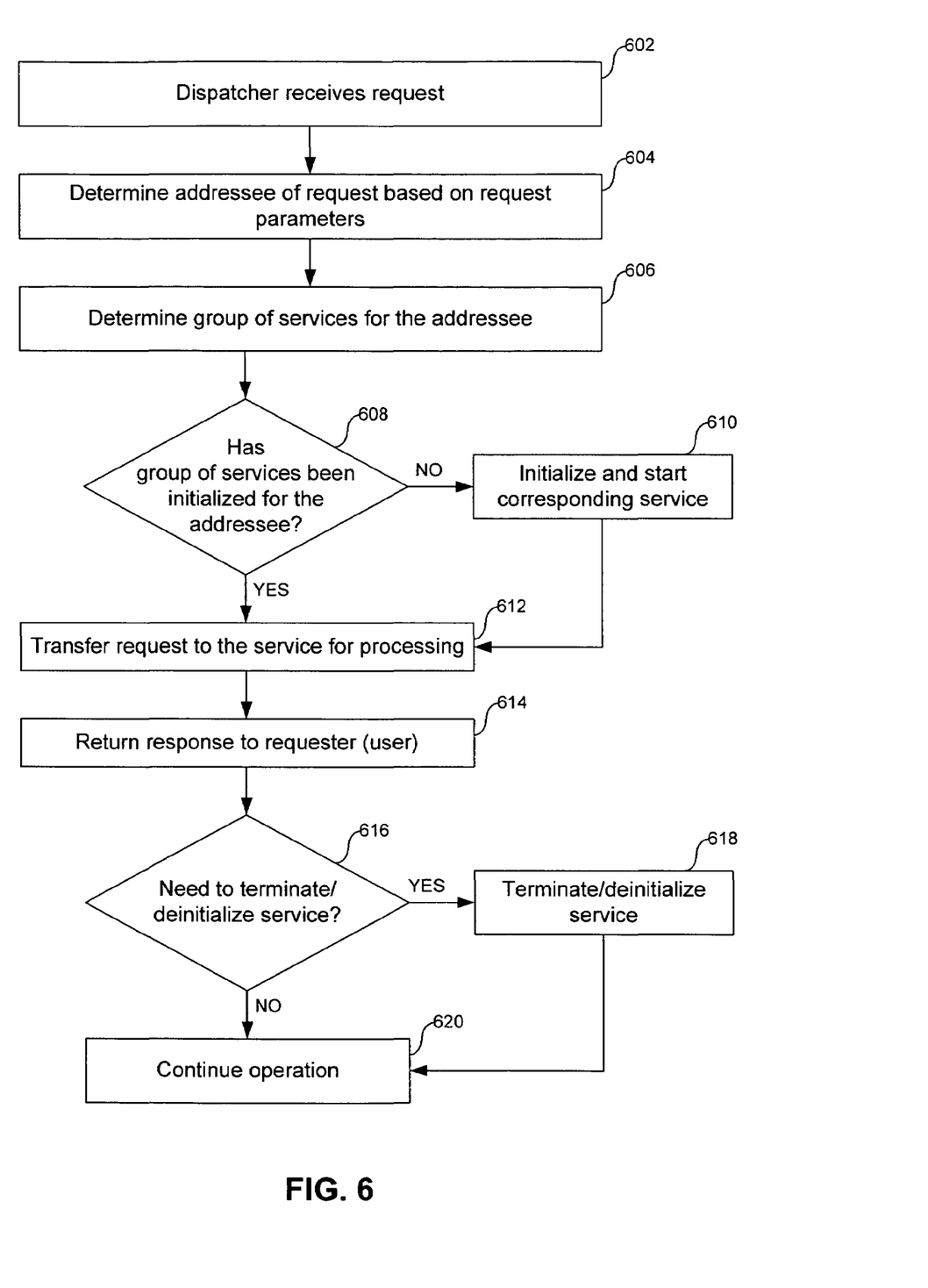
FIG. 6 illustrates the process of multiplexing of a particular service using the service VPS.

FIG. 6 illustrates the process of multiplexing server processes using the service VPS 304. As shown in FIG. 6, a dispatcher receives a request for service 402 (step 602). An example of a dispatcher is an instance of a service VPS 304, for example, one that is specifically dedicated to the function of intercepting such user requests. The addressee of the request 402 is determined, based on request parameters (step 604). The group of services (in other words, the VPS 202 that needs to perform the actual responding to the request 402) for that addressee is determined (step 606). The service VPS 304 then needs to determine whether the target group of services (e.g., a VPS 202) has been initialized for that particular request 402 (step 608). If it has not been initialized, then it needs to be initialized and launched (step 610). The request 402 is then transferred to that VPS 202 for processing, see 412 in FIG. 4 (step 612). The response 404, once generated by the VPS 202, is then returned to the requestor (user or administrator) (step 614). If the started-up group of services or VPS 202 needs to be terminated or de-initialized (step 616) then that VPS 202 is terminated (step 618). Normal operation then continues (step 620).

The request for service that triggers multiplexing can be received using a network protocol, such as TCP/IP; or it may be received within a packet of data. In other words, the parameters of the request 402 could be determined based on packet metadata (e.g., the IP address to which this packet needs to be delivered), without "looking inside" the packet itself, or it may be based on the data within the packet.

The use of a dedicated VPS 304 for the purpose of administrative functions provides the advantage of having greater security for the process, and better control over the administration of the VPSs 202, and their resources. Better security is usually due to possible isolation of VPSs from each other, and due to unification of configuration of the VPSs, and therefore standardization of administration operations, which simplifies support operations for user and administration services themselves.

Additionally, the overhead associated with this approach is less compared to conventional approaches, which either use operating system calls, or embed these functions in each VPS 202.

Figure 7:
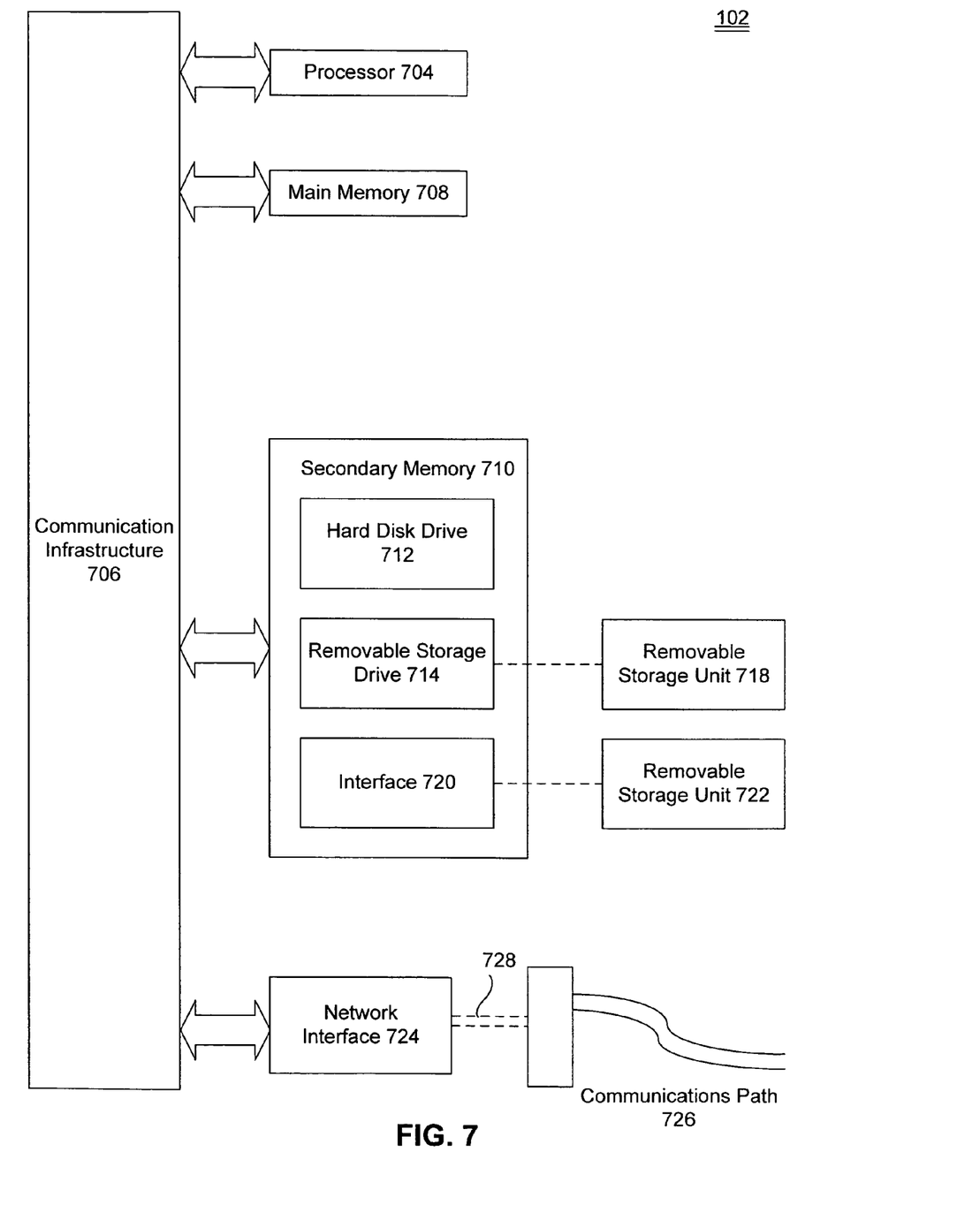
FIG. 7 illustrates an example of a computer architecture that may be used in the present invention.

An example of a computer system, or host, where the present invention may be used is illustrated in FIG. 7. The computer system 102 includes one or more processors, such as processor 704. The processor 704 is connected to a communication infrastructure 706, such as a bus or network). Various software implementations are described in terms of this exemplary computer system. After reading this description, it will become apparent to a person skilled in the relevant art how to implement the invention using other computer systems and/or computer architectures.

Computer system 102 also includes a main memory 708, preferably random access memory (RAM), and may also include a secondary memory 710. The secondary memory 710 may include, for example, a hard disk drive 712 and/or a removable storage drive 714, representing a magnetic tape drive, an optical disk drive, etc. The removable storage drive 714 reads from and/or writes to a removable storage unit 718 in a well-known manner. Removable storage unit 718 represents a magnetic tape, optical disk, or other storage medium that is read by and written to by removable storage drive 714. As will be appreciated, the removable storage unit 718 can include a computer usable storage medium having stored therein computer software and/or data.

In alternative implementations, secondary memory 710 may include other means for allowing computer programs or other instructions to be loaded into computer system 102. Such means may include, for example, a removable storage unit 722 and an interface 720. An example of such means may include a removable memory chip (such as an EPROM, or PROM) and associated socket, or other removable storage units 722 and interfaces 720 which allow software and data to be transferred from the removable storage unit 722 to computer system 102.

Computer system 102 may also include one or more communications interfaces, such as communications interface 724. Communications interface 724 allows software and data to be transferred between computer system 102 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. This channel 726 carries signals 728 and may be implemented using wire or cable, fiber optics, an RF link and other communications channels. In an embodiment of the invention, signals 728 comprise data packets sent to processor 704. Information representing processed packets can also be sent in the form of signals 728 from processor 704 through communications path 726.

The terms "computer program medium" and "computer usable medium" are used to generally refer to media such as removable storage units 718 and 722, a hard disk installed in hard disk drive 712, and signals 728, which provide software to the computer system 102.

Computer programs are stored in main memory 708 and/or secondary memory 710. Computer programs may also be received via communications interface 724. Such computer programs, when executed, enable the computer system 102 to implement the present invention as discussed herein. In particular, the computer programs, when executed, enable the processor 704 to implement the present invention. Where the invention is implemented using software, the software may be stored in a computer program product and loaded into computer system 102 using removable storage drive 714, hard drive 712 or communications interface 724.

Having thus described a preferred embodiment of a system and method, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for managing administration of computer services provided to users comprising:
    a computer system comprising:
        at least one hardware processor; an operating system running on the computer system;
        a plurality of Virtual Private Servers (VPSs) running on the computer system;
        a plurality of server processes running on the computer system, each of the server processes running within respective VPS, the server processes provide services to a plurality of remote users; and
        a plurality of dedicated Virtual Private Servers (VPSs) with a set of services that perform administrative operations,
        each of the dedicated VPSs provide administrative services to each of the server processes running in other VPSs;
        each of the plurality of VPSs and each of the dedicated VPSs are isolated from each other by a logical isolation of processes;
        the administrative operations include servicing of operations that require multiplexing of the server processes; and
        the multiplexing is performed using separation of requests based on a content of a request directed to the server process or separation of requests based on a different network protocol address.

2. The system of claim 1, wherein the server process is any of a file server, an authentication server, a chroot environment server, a jail environment, a print server, a POP3 server, an IMAP/IMAP4 server, an SMTP server, a scheduler server, a COM/COM+/DCOM server, a cryptographies server, a browser server, a DHCP server, a distributed file system server, a Distributed Link tracking server, an event log server, a reporting server, a file replicator server, an indexing server, a firewall server, a Kerberos server, an IPSEC server, a logon server, a Network DDE server, an NLA server, a performance logs and alerts server, a plug and play server, a print spooler server, a protected storage server, a disk encryption server, a routing server, a remote access server, a system event notification server, a telnet server, an uninterruptible power supply server, a Windows Management Instrumentation (WMI) server, a wireless configuration server, a WMI performance adaptor server, a data base server, a network address translation server, an IRC server, an inetd server, a volume shadow copy server, a boot and remote boot server, a finger server, a who server, a rexec server, a webster server, a conference server, a zip server, an afbackup server, an ASP server, and a fido server.

3. The system of claim 1, wherein the server process is any of an FTP server, a sand box environment server, a chat server, an X windows server, a secure shell (SSH) server, and a socks server.

4. The system of claim 1, wherein the server process is a webserver.

5. The system of claim 1, wherein the server process is any of a file server, a VPS, a Windows Terminal Service, a domain name server, an SSL server, an instant messaging server, a message write server, a security account manager server, a telephony server, a virtual disk server, a Windows installer server, a radius server, and a backup server.

6. The system of claim 1, wherein the server process includes any of a WAP server, Plesk Server™, a Virtuozzo server, a Virtuozzo for Windows™ server, a wireless access server, a wireless router and a wireless access point.

7. The system of claim 1, wherein the administrative operations include any of:
collection of statistics relating to the server process;
servicing of requests for management of the server process;
servicing of requests for management of operating system functions;
servicing of requests for computer system resource allocation;
servicing of requests for computer system resource re-allocation;
servicing of requests for authorization within the operating system;
servicing of requests for authorization within the server process;
servicing of requests that the server process is forbidden from executing;
servicing of requests that the server process cannot execute;
servicing of operations that potentially can cause a fault in the server process;
data backup and restore operations, update and patch installation;
checking permissions for operations;
security-related analysis and operations;
audit of operations;
application installation and configuration;
network and other OS and application parameter configuration;
driver installation and upgrade;
spam filter operation;
firewall installation and configuration;
creation and deletion of users;
creation and deletion of groups;
license-related management; and
remote access management.

8. The system of claim 1, wherein the multiplexing is performed using separation of requests based on a different network protocol address.

9. The system of claim 1, wherein the multiplexing is performed using separation of requests based on a content of a request directed to the server process.

10. The system of claim 1, wherein the administrative services include any of:
servicing of requests for authorization within the operating system;
servicing of requests for authorization within the server process;
creation and deletion of users;
creation and deletion of groups;
license-related management;
remote access management; and
security-related analysis and operations.

11. The system of claim 1, wherein the administrative services include any of:
servicing of requests that the server process is forbidden from executing;
servicing of requests that the server process cannot execute; and
servicing of operations that potentially can cause a fault in the server process.

12. The system of claim 1, wherein the administrative services include application installation and configuration.

13. The system of claim 1, wherein the administrative services include data backup and restore operations.

14. The system of claim 1, wherein VPS isolation comprises any of, physical isolation of processes, namespace isolation, data isolation, address isolation, fault isolation and performance isolation.

15. The system of claim 1, wherein VPS isolation includes resource isolation.

16. The system of claim 1, wherein the administrative services include any of servicing of VPS migration requests;
servicing of processes migration requests; and
servicing of requests for computer system resources.

17. A system for managing administration of computer services provided to users comprising:
a computer system comprising:
at least one hardware processor;
an operating system running on the computer system;
a plurality of Virtual Private Servers (VPSs) running on the computer system;
a plurality of server processes running on the computer system that provide services to a plurality of remote users, each of the server processes running within respective VPS; and
a plurality of dedicated Virtual Private Servers (VPSs),
each of the dedicated VPSs provides administrative services to each of the server processes running in other VPSs;
each of the plurality of VPSs and each of the dedicated VPSs are isolated from each other by a physical isolation of processes;
the administrative operations include servicing of operations that require multiplexing of the server processes; and
the multiplexing is performed using separation of requests based on a content of a request directed to the server process or separation of requests based on a different network protocol address.

18. The system of claim 17, wherein the server processes include any of a file server, an authentication server, a chroot environment server, a jail environment, a print server, a POP3 server, an IMAP/IMAP4 server, a SMTP server, a scheduler server, a COM/COM+/DCOM server, a cryptographics server, a browser server, a DHCP server, a distributed file system server, a Distributed Link tracking server, an event log server, a reporting server, a file replicator server, an indexing server, a firewall server, a Kerberos server, an IPSEC server, a logon server, a Network DDE server, an NLA server, a logs and alerts server, a plug and play server, a print spooler server, a protected storage server, a disk encryption server, a routing server, a remote access server, a system event notification server, a telnet server, an uninterruptible power supply server, a Windows Management Instrumentation (WMI) wireless configuration server, a WMI performance adaptor server, a data base server, a network address translation server, an IRC server, an inetd server, a volume shadow copy server, a boot and remote boot server, a finger server, a who server, a rexec server, a webster server, a conference server, a zip server, an afbackup server, an ASP server, a fido server, WAP servers, Plesk Server™, Virtuozzo servers, Virtuozzo for Windows™ servers, wireless access servers, wireless routers and wireless access points.

19. The system of claim 17, wherein the server process is any of an FTP server, a sand box environment server, a chat server, an X windows server, a secure shell (SSH) server, and a socks server.

20. The system of claim 17, wherein the server process is a webserver.

21. The system of claim 17, wherein the server process is any of a file server, a VPS, a Windows Terminal Service, a domain name server, an SSL server, an instant messaging server, a message write server, a security account manager server, a telephony server, a virtual disk server, a Windows installer server, a radius server, and a backup server.

22. The system of claim 17, wherein the administrative services include any of:
    collection of statistics relating to the server process;
    servicing of requests for management of the server process;
    servicing of requests for management of operating system functions;
    servicing of requests for computer system resource allocation;
    servicing of requests for computer system resource re-allocation;
    data backup and restore operations, update installation;
    security-related analysis and operations;
    audit of operations;
    network and other OS and application parameter configuration;
    driver installation and upgrade;
    spam filter operation; and
    firewall installation and configuration.

23. The system of claim 17, wherein the multiplexing is based on a network protocol addressing.

24. The system of claim 17, wherein the multiplexing is based on a content of a request directed to the server process.

25. The system of claim 17, wherein the administrative services include any of:
    servicing of requests for authorization within the operating system;
    servicing of requests for authorization within the server process;
    checking permissions for operations;
    creation and deletion of users;
    creation and deletion of groups;
    license-related management;
    remote access management; and
    security-related analysis and operations.

26. The system of claim 17, wherein the administrative services include any of:
    servicing of requests that the server process is forbidden from executing; and
    servicing of operations that potentially can cause a fault in the server process.

27. The system of claim 17, wherein the administrative services include application installation and configuration.

28. The system of claim 17, wherein the administrative services include data backup and restore operations.

29. The system of claim 17, wherein VPS isolation further comprises any of logical isolation of processes, namespace isolation, data isolation, address isolation, fault isolation and performance isolation.

30. The system of claim 17, wherein VPS isolation includes resource isolation.

31. The system of claim 17, wherein the administrative services include any of:
    servicing of VPS migration requests;
    servicing of processes migration requests; and
    servicing of requests for computer system resources.

32. A system for managing computer services provided to users comprising:
    a computer system comprising:
        at least one hardware processor;
        an operating system running on the computer system;
        a plurality of Virtual Private Servers (VPSs) running on the computer system;
        a plurality of server processes running on the computer system, each of the server processes running within respective VPS,
        the server processes provide services to a plurality of remote users; and
        a plurality of dedicated Virtual Private Servers (VPSs) that instantiates and terminates the server processes running in other VPSs in response to user requests for the service,
        each of the plurality of VPSs and each of the dedicated VPSs are isolated from each other by a namespace isolation of processes;
        the administrative operations include servicing of operations that require multiplexing of the server processes; and
        the multiplexing is performed using separation of requests based on a content of a request directed to the server process or separation of requests based on a different network protocol address.

33. The system of claim 32, wherein the server processes include any of a webserver, a file server, an FTP server, an authentication server, a VPS, a chroot environment server, a jail environment, a sand box environment server, a print server and a Windows Terminal Service, a POP3 server, an IMAP/IMAP4 server, a SMTP server, a scheduler server, a COM/COM+/DCOM server, a cryptographics server, a browser server, a DHCP server, a Distributed file system server, a Distributed Link tracking server, an event log server, a reporting server, a DNS server, a file replicator server, an SSL server, an indexing server, a firewall server, a Kerberos server, an IPSEC server, an instant messaging server, a message write server, a logon server, a Network DDE server, an NLA server, a performance logs and alerts server, a plug and play server, a print spooler server, a protected storage server, a disk encryption server, a routing server, a remote access server, a security account manager server, a system event notification server, a telnet server, a telephony server, an uninterruptible power supply server, a virtual disk server, a Windows installer server, a Windows management instrumentation wireless configuration server, a WMI performance adaptor server, a data base server, a Network address translation server, an IRC server, a chat server, an X windows server, an inetd server, a volume shadow copy server, a boot and remote boot server, a finger server, a secure shell (SSH) server, a who server, a rexec server, a webster server, a conference server, a radius server, a zip server, a socks server, an afbackup server, a backup server, an ASP server, a fido server, a WAP server, Plesk Server™, a Virtuozzo server, a Virtuozzo for Windows™ server, a wireless access server, a wireless router and a wireless access point.

34. The system of claim 32, wherein the instantiation is based on a network protocol addressing the user requests.

35. The system of claim 32, wherein the instantiation is based on a content of the user requests.

* * * * *